United States Patent [19]

Dezawa et al.

[11] 4,442,159

[45] Apr. 10, 1984

[54] MAGNETIC RECORDING MEDIUM

[75] Inventors: Shin-ichiro Dezawa; Goro Akashi; Tatsuji Kitamoto, all of Kanagawa, Japan

[73] Assignee: Fuji Photo Film Co., Ltd., Kanagawa, Japan

[21] Appl. No.: 382,336

[22] Filed: May 26, 1982

[30] Foreign Application Priority Data

May 26, 1981 [JP] Japan .................................. 56-79685

[51] Int. Cl.³ ............................ G11B 5/68; G11B 5/70
[52] U.S. Cl. .................................. 428/212; 252/62.54;
360/134; 360/135; 360/136; 427/128; 427/131;
428/328; 428/329; 428/336; 428/694; 428/900
[58] Field of Search ............... 428/692, 693, 694, 900,
428/212, 328, 329, 336; 427/131, 128;
360/134–136; 252/62.54

[56] References Cited

U.S. PATENT DOCUMENTS

| 3,023,166 | 2/1962 | Duinker | 428/900 |
| 3,185,775 | 5/1965 | Camras | 360/134 |
| 4,135,016 | 1/1979 | Ogawa | 428/900 |

Primary Examiner—Ellis P. Robinson
Attorney, Agent, or Firm—Sughrue, Mion, Zinn, Macpeak & Seas

[57] ABSTRACT

A magnetic recording medium which comprises a non-magnetic support having thereon two or more magnetic layers comprising magnetic particles in a binder. The magnetic layer(s) other than the topmost layer comprises needle-shaped magnetic particles. The topmost layer comprises plate-shaped magnetic particles which have axes of easy magnetization perpendicular to the individual plate planes and the plate planes are oriented substantially parallel to the surface of the magnetic layer.

8 Claims, 2 Drawing Figures

MAGNETIC RECORDING MEDIUM

FIELD OF THE INVENTION

The present invention relates to a magnetic recording medium, more particularly, to a magnetic recording medium which provides a high output level, a high signal density with a high signal to noise ratio which is useful for perpendicular magnetic recording.

BACKGROUND OF THE INVENTION

Materials which have high coercive forces (Hc), and smooth surfaces have been regarded as good media for high density recording. As recording media for this purpose, recording media based on magnetic powders and recording media based on thin metal films formed by the evaporation, metal plating or other processes have been used. However, both types of recording media suffer from a lack of stability because they are liable to be oxidized, and attempts to put them to practical use have been unsuccessful.

In recent years, to attain high output levels in short-wave length recording systems, recording systems which utilize (1) the vertical component of the magnetic field used for recording or (2) perpendicular magnetic recording have been proposed.

Although these systems are excellent in principle, excellent recording media useful therein are not available.

Specifically, using a magnetic material made of conventional needle-shaped magnetic particles oriented at random has been proposed. However, such a material does not provide sufficient output due to the low relative density of the vertical component oriented in the perpendicular direction.

Further, the use of needle-shaped magnetic particles oriented perpendicular to the plane of the magnetic layer has been proposed, and a number of methods for orienting such magnetic particles have also been proposed. However, sufficient orientation has not been achieved with these methods as the initially vertically oriented needle-shaped particles tilt down toward a plane parallel to the surface of the magnetic layer upon contraction of the magnetic coating in its thickness direction on drying.

In addition, recording media comprising a thin metal film formed by sputtering or evaporation techniques for perpendicular magnetic recording have been proposed. However, such are insufficient in terms of chemical stability, magnetic head abrasion resistance and durability.

In the present invention, the term "perpendicular magnetic recording" refers to the recording process in which a magnetic head as illustrated in FIG. 1 is used; such a process is described in *Television Gakkaishi*, Vol. 32, No. 5, p. 399 (1978) or *IEEE Transactions on Magnetics* 1980 (1) Vol. MAG-16, November 1, p 71.

On the other hand, the expression "the recording system utilizing the vertical component of magnetization" refers to the recording system in which the vertical component of a magnetic field created by a ring head on the surface of a magnetic layer, as illustrated in FIG. 2, is utilized; such a system is described in *IEEE Transactions on Magnetics* Vol. 15, No. 6, November 1979. When a head having a narrow gap is used, recording is, in general, carried out very efficiently.

It is known that using a magnetic material of high coercive force to raise the output in short wave length recording results in lowering output in long wave length recording. To solve this problem, the use of a magnetic layer comprising two layers, a lower layer having low coercivity and a high magnetic flux density and an upper layer having high coercivity force has been proposed. As the upper layer, a metallic magnetic powder such as cobalt modified iron oxide powder, $CrO_2$ powder or the like, a metal thin film formed by an evaporation process, a metal plating process or the like, and the like are known. Each of these techniques exhibits good characteristics within certain limits. However, there are limits on the characteristics attainable using these techniques as magnetic material present in the vicinity of the surface of a magnetic layer has the tendency to orient in a plane parallel to the surface and, therefore, the vertical magnetization component in the vicinity of the surface contributes little to recording.

Processes for orienting magnetic particles (contained in an upper layer) perpendicular to the layer plane have also been proposed. However, since the magnetic materials employed in such processes were made of needle-shaped magnetic particles, sufficient orientation in the perpendicular direction was not achieved due to the "tilting" effect mentioned, and, consequently, satisfactory characteristics were not obtained.

SUMMARY OF THE INVENTION

Therefore, an object of the present invention is to provide a magnetic recording medium which does not have the problems above described. Namely, the object of the present invention is to provide a magnetic recording medium which has a high output level and a high signal to noise ratio in both long wavelength and the short wavelength recording.

More specifically, the object of the present invention is to provide a recording medium which effectively utilizes the vertical component of the recording magnetic field in the surface part of the magnetic layer thereof, i.e., the surface part to a degree of about ⅔ of the width of recording head gap, generally a thickness of about 0.1 to 1 μm.

It has now been found that the above described object is attained by a magnetic recording medium having a magnetic layer comprising the upper and lower layers, the lower layer comprising needle-shaped magnetic particles and the upper layer comprising plate-shaped magnetic particles where the major planes of the plates are oriented parallel to the magnetic layer surface.

Figure 1:
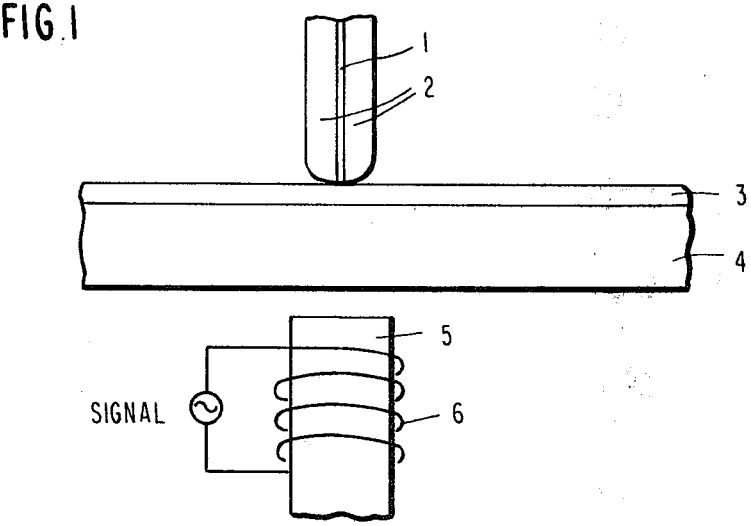
FIG. 1 is a schematic illustration of a recording head and a recording medium employed in perpendicular magnetic recording.
Figure 2:
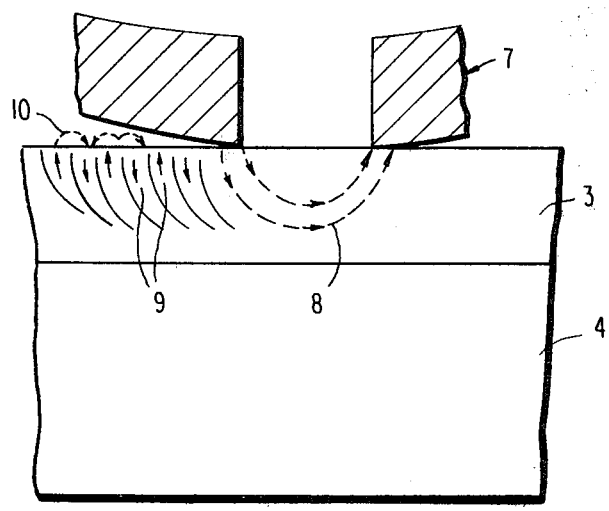
FIG. 2 is a schematic illustration of a recording system utilizing the vertical component of magnetic field.

In the Figures, numeral 1 designates a main head for perpendicular magnetic recording, numeral 2 a support for the main head, numeral 3 a magnetic layer, numeral 4 a support for the magnetic layer, numeral 5 an auxiliary head for the perpendicular magnetic recording, numeral 6 a signal generating coil, numeral 7 a part of a ring head, numeral 8 a magnetic field created by the ring head, numeral 9 a recorded magnetic field and numeral 10 leakage flux.

DETAILED DESCRIPTION OF THE INVENTION

Magnetic materials comprising needle-shaped particles which can be used in the lower layer of the present invention are those which have been used in conventional magnetic recording media as disclosed in, for example, U.S. Pat. No. 4,135,016; specific examples include ferromagnetic iron oxides such as magnetite, maghemite, those which have the general formula $FeO_x$ wherein x is in the range of $1.33 < 1.5$, Co-modified ferromagnetic iron oxides; $CrO_2$; ferromagnetic metal powders; and the like, as disclosed in U.S. Pat. No. 4,135,016

The needle-shaped particles having a length in the range of 0.1 $\mu$m to 1 $\mu$m and a ratio of length to width of 4:1 to 20:1 are generally employed in the lower layer. In particular, those which have a length ranging from 0.15 $\mu$m to 0.7 $\mu$m and a ratio of length to width more than 6:1 are preferred.

A desired coercive force in the lower layer of the present invention is generally in the range of 300 Oe to 2,000 Oe, though it changes depending upon the end use of the recording medium. The lower layer generally has a thickness of about 1 to about 10 $\mu$m.

Plate-shaped magnetic particles which can be employed in the upper layer of the present invention are disclosed in Japanese Patent Application (OPI) Nos. 86103/80 and 60002/81 (the term "OPI" as used herein refers to a "published unexamined patent application") and Japanese Patent Publication (Examined) Nos. 25796/72 and 13909/67 and include those which have axes of easy magnetization in a direction perpendicular to individual major plate planes of the particles, such as hexagonal barium ferrites; they do not include those which have axes of easy magnetization only in a direction parallel to individual major plate planes of particles.

The plate-shaped magnetic particles which can be employed in the present invention satisfies the following relation:

$$K/(2\pi M_s^2) \geq 1$$

wherein K represents the magnetic anisotropy constant in the direction perpendicular to the major plane of an individual particle plate, $M_s$ represents the saturation magnetization value thereof, and $\pi$ is the ratio of circumference of a circle to its diameter.

Such magnetic materials include barium ferrite and other hexagonal ferrites represented by the following general formulae: $MO \cdot 6Fe_2O_3$, $BaM_2Fe_{16}O_{27}$, $Ba_2M_2Fe_{12}O_{22}$, $Ba_3M_2Fe_{24}O_{41}$ which are known materials. In the above formulae, M represents a divalent metal ion, and materials from Groups II, IV, V, VIa and VIb of the Periodic Table can be used. Specific examples of such elements include Fe, Mn, Co, Ni, Zn, Mg, Ca, Cu, Si, Ge, Ti, Zr, P, $(Li^+ + Fe^{3+})/2$ and the like. The above ferrites may contain such metal ions up to about 20 atm % in place of the Ba ions and/or the Fe ions.

Many other hexagonal ferrites can also be employed in the present invention.

The plate-shaped magnetic particles employed in the present invention do not have any particular restriction on their size. However, the size should be selected depending on the wavelength to be recorded, preferably, shorter than ½ of the wavelength, and the required signal to noise ratio. In general, particles having a mean diameter of 0.1 $\mu$m to 20 $\mu$m are employed, and those which have a mean diameter of 0.5 $\mu$m to 10 $\mu$m are especially effective. Also, particles having a ratio of diameter to thickness of about 2:1 to about 30:1 preferably 4:1 to 30:1, can be generally used. The coercive force thereof is also determined depending upon the recording purpose. However, generally a coercive force in the range from 300 Oe to 3,000 Oe is preferred. The upper layer generally has a thickness of about 0.5 to about 3 $\mu$m.

An attempt to use such magnetic materials is reported in, for example, U.S. Pat. No. 3,023,166. However, such are conventional recording systems since the axes of easy magnetization inherent in the magnetic particles are oriented to align parallel to the surface of the magnetic layer. In addition, according to our research, such materials only provide axes of easy magnetization with insufficient orientation in planes parallel to the surface of the magnetic layer because, as in the case of vertical orientation of needle-shaped magnetic particles, the plates tilted down to lie parallel to the surface of the magnetic layer at drying.

In accordance with one embodiment of the present invention, magnetic coatings are prepared by dispersing each of these magnetic materials into a binder and a solvent, optionally with conventional additives which are added depending upon the end use of the recording medium, and coated on a non-magnetic support.

The magnetic coating containing the needle-shaped magnetic particles is firstly coated on the support, oriented so that the needles align in planes parallel to the coated layer surface, if desired or necessary, and dried. After drying, the surface of the coated layer may be smoothened using the supercalendering process, as described in U.S. Pat. No. 4,135,016. The higher the smoothness, the better the S/N ratio, but excessive smoothness sometimes may adversely affect the running properties and durability of magnetic recording medium.

The second layer is formed by coating a magnetic coating containing plate-shaped magnetic particles on the first layer, orienting the easy magnetization axes of the particles in a direction perpendicular to the coated layer surface, as disclosed, for example, in Japanese Patent Application (OPI) Nos. 129937/80, 142421/80 and 163633/80 and then drying. Thereafter, the surface of the thus formed layer is usually smoothened by supercalendering, as disclosed in U.S. Pat. No. 4,135,016.

Due to contraction effects in the magnetic layer upon drying, the plate-shaped particles are tilted down and oriented in the magnetic layer in such direction that they become parallel to the surface of the magnetic layer. Due to this orientation effect, it is thus not always necessary for the second layer to be oriented using an applied magnetic field.

The binders, solvents and non-magnetic supports employed in the present invention include those which are conventionally used in this art as disclosed in U.S. Pat. No. 4,135,018.

Examples of the binders include thermoplastic resins, thermosetting resins and reaction hardenable resins.

Examples of solvents include both polar and non-polar solvents, such as esters, ethers, ketones, alcohols, aliphatic hydrocarbons, aromatic hydrocarbons and the like, for example, methyl ethyl ketone, methyl isobutyl ketone (MIBK), toluene, cyclohexanone, dimethylformamide, tetrahydrofuran, ethyl acetate, propyl acetate, butyl acetate, etc. These solvents are frequently used as a mixture of two or more thereof. Water is used as a solvent when water soluble resins are used as binders.

Optional additives include conventional dispersing agents, lubricants, carbon black, abrasives and the like, and they are added depending upon the end use of the recording material.

As the support, aluminum, glass, polyesters or cellulose derivatives are frequently used. However, the support of the present invention is not limited to these materials.

The present invention will now be illustrated in more detail by the following example. However, the present invention should not be construed as being limited to the following example in any way.

EXAMPLE 1

Cobalt-modified magnetic iron oxide having a mean particle length of 0.3 μm and a ratio of the length to the diameter of about 15:1 was dispersed according to the formula given in Table 2 using a glass bead mill. The resulting dispersion was filtered through a filter having an average pore size of 2 μm and then coated in a thickness of 5 μm on a 20 μm-thick polyethylene terephthalate film. The coated layer was oriented in the longitudinal direction of the tape and parallel to the coated surface by applying a magnetic field thereto (2 K Gauss for 0.6 second) and then dried at a temperature of 100° C. for one minute. A part of the material obtained was sampled and its magnetic characteristics were measured as characteristics of a lower layer.

Next, plate-shaped barium ferrite having a mean particle diameter of 1.1 μm, a mean thickness of 0.12 μm and an Hc of 1,200 Oe was dispersed according to the formula given in Table 1, filtered through a filter having an average pore size of 2 μm and then coated in a thickness of 1.2 μm on the above-described magnetic layer containing the needle-shaped magnetic particles. The resulting coated layer was subjected to vertical orientation by being passed between the gap between the N-pole and the S-pole of an electromagnet (2 K Gauss for 15 seconds). Thereafter, it was dried at 100° C. for one minute followed by supercalendering to smoothen the surface of the magnetic layer. The thus obtained material was slit into tapes of a width of ½ inch and identified Sample 1.

The following samples were also made for comparison with Sample 1.

COMPARATIVE EXAMPLE 1

A tape was made in the same manner as in Example 1 except that instead of the magnetic coating for the upper layer the same magnetic coating as used for the lower layer was employed in the upper layer. The thus obtained tape was identified Comparative Sample 1.

COMPARATIVE EXAMPLE 2

A tape was made in the same manner as in Example 1 except that only the upper layer was coated (without coating the lower layer); the same was idenfified Comparative Sample 2.

The magnetic properties of these samples are shown in Table 3. The method for determining the magnetic properties is described hereinafter.

It can be seen from the results shown in Table 3 that the sample of the present invention provided higher output and a higher signal to noise ratio than Comparative Sample 2 in the short wavelength and that in the long wavelength recording the output thereof was equivalent to that of Comparative Sample 1. Thus, the results in Table 3 show that the sample of the present invention exhibits excellent characteristics over the desired wavelength range.

In the above-described example, the magnetic layer was constructed of two layers. However, apart from the topmost layer in which plate-shaped magnetic particles must be present, the lower magnetic layer may comprise two, three or more layers differing, from example, in coercive force, as desired.

Method for Determining Magnetic Properties

Output measurements were conducted using a ring head having an effective gap length of about 0.2 μm and a track width of 50 μm using a deck whose head speed was reduced to one-half by remodelling a standard VHS system and using recording frequencies of 0.7 MHz, 2.9 MHz and 9 MHz so that recorded wavelengths could be adjusted to 4 μm, 1 μm and 0.3 μm, respectively.

The signal to noise ratio of each sample was measured as a carrier to noise ratio (CN ratio) by passing the output signal through a limiter amplifier, then introducing it into a spectrum analyzer, and measuring the level of carrier signal at 4 MHz and the level of noise signal at 3 MHz. The CN ratio is represented as a ratio of these signal levels.

Both the output and the CN ratios for Sample 1 and Comparative Sample 1 set forth in Table 3 are relative values taking those of Comparative Sample 2 as standard.

TABLE 1

| | Parts by Weight |
|---|---|
| Plate-shaped Magnetic Particles | 100 |
| Alcohol Modified Vinyl Chloride-Vinyl Acetate Copolymer (VAGH, a product of Union Carbide Co., Ltd.) | 7 |
| Polyurethane (Nipporan 2301, a product of Nippon Polyurethane Co., Ltd.) | 7 |
| Polyisocyanate (Coronate L. a product of Nippon Polyurethane Co., Ltd.) | 2 |
| Soya Lecithin | 0.5 |
| MIBK | 300 |

(Note) Polyisocyanate was added after completion of the dispersion

TABLE 2

| | Parts by Weight |
|---|---|
| Needle-shaped Magnetic Particles | 100 |
| Alcohol Modified Vinyl Chloride-Vinyl Acetate Copolymer | 10 |
| Polyurethane (Nipporan 2301, a product of Nippon Polyurethane Co., Ltd.) | 10 |
| Polyisocyanate (Coronate L, a product of Nippon Polyurethane Co., Ltd.) | 3 |
| Soya Lecithin | 1 |
| MIBK | 300 |

(Note) Polyisocyanate was added after completion of the dispersing.

TABLE 3

| | | | Sample 1 | Comparative 1 | Sample 2 |
|---|---|---|---|---|---|
| Magnetic Properties | Parallel to Layer | Hc | 862 | 755 | 1210 |
| | | SQ | 0.40 | 0.73 | 0.40 |
| | Perpendicular to Layer | Hc | 630 | 490 | 1200 |
| | | SQ | 0.34 | 0.21 | 0.66 |

TABLE 3-continued

|  |  | Sample 1 | Comparative 1 | Sample 2 |
|---|---|---|---|---|
|  | Recorded Wavelength |  |  |  |
| Relative | 4 μm | 4.7 | 3.1 | 0 |
| Output | 1 μm | 1.1 | −3.3 | 0 |
| (dB) | 0.3 μm | 0.9 | −6.1 | 0 |
| CN ratio | (4 MHz) | 0.3 | −5.7 | 0 |

The magnetic properties of the upper layer and those of the lower layer of Sample 1 formed as described in Example 1 are shown in Table 4.

TABLE 4

Magnetic Properties of Upper and Lower Layers In Sample 1

| Direction |  | Lower Layer | Upper Layer |
|---|---|---|---|
| Parallel | Hc | 750 | 1205 |
|  | SQ | 0.74 | 0.40 |
| Perpendicular | Hc | 492 | 1200 |
|  | SQ | 0.20 | 0.65 |

While the invention has been described in detail and with reference to specific embodiments thereof, it will be apparent to one skilled in the art that various changes and modifications can be made therein without departing from the spirit and scope thereof.

What is claimed is:

1. A magnetic recording medium which comprises
   (a) a non-magnetic support;
   (b) a magnetic layer comprising magnetic particles dispersed in a binder and said magnetic layer comprising two or more layers,
      (i) the layer(s) other than the topmost layer containing needle-shaped magnetic particles, and
      (ii) the topmost layer containing plate-shaped hexagonal ferrite magnetic particles having a mean diameter of 0.1 μm to 20 μm, a coercive force of 300 to 3,000 oersteads, and satisfying the following relationship $$K/(2\pi M_s^2) \geq 1$$

wherein K represents the magnetic anisotropy constant in the direction perpendicular to the major plane of an individual particle plate, $M_s$ represents the saturation magnetization value and $\pi$ is the ratio of the circumference of a circle to its diameter, and which have axes of easy magnetization perpendicular to their individual plate planes and whose plate planes are oriented substantially parallel to the surface of the magnetic layer.

2. The magnetic recording medium as claimed in claim 1, wherein said plate-shaped magnetic particles comprise barium ferrite wherein up to about 20 atm % of the Ba ions or/and the Fe ions may be replaced by other metal ions.

3. The magnetic recording medium as claimed in claim 1 or claim 2, wherein said needle-shaped magnetic particles contained in the lower layer(s) are oriented parallel to the surface of the magnetic layer.

4. The magnetic recording medium as claimed in claim 1 or claim 2, wherein said plate-shaped magnetic particles have a mean diameter of 0.2 μm to 2 μm and a coercive force of 300 Oe to 3,000 Oe.

5. The recording medium as claimed in claim 4 wherein said plate-shaped magnetic particles have a ratio of diameter to thickness of 2:1 to 30:1.

6. The magnetic recording medium as claimed in claim 4 wherein said plate-shaped magnetic particles have a ratio of diameter to thickness of 4:1 to 30:1.

7. The magnetic recording medium as claimed in claim 1 wherein said topmost layer has a thickness of 0.5 μm to 3 μm.

8. The magnetic recording medium as claimed in claim 1 wherein said plate-shaped magnetic particles comprise hexagonal ferrites represented by the following formulae: $MO \cdot 6Fe_2O_3$, $BaM_2Fe_{16}O_{27}$, $Ba_2M_2Fe_{12}O_{22}$, $Ba_3M_2Fe_{24}O_{41}$, wherein M represents a divalent metal ion, and materials from Groups II, IV, V, VIa and VIb of the Periodic Table and up to about 20 atomic % of the Ba ions and/or the Fe ions may be replaced by other metal ions.

* * * * *